(12) United States Patent
Lee et al.

(10) Patent No.: US 11,333,156 B2
(45) Date of Patent: May 17, 2022

(54) METHOD FOR CONTROLLING ANGULAR SPEED OF A FAN BY ADJUSTING AN INTEGRAL VALUE BASED ON MINIMUM OR MAXIMUM OUTPUT

(71) Applicants: Inventec (Pudong) Technology Corp., Shanghai (CN); Inventec Corporation, Taipei (TW)

(72) Inventors: Cheng-Ming Lee, Taipei (TW); Kai-Yang Tung, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 403 days.

(21) Appl. No.: 16/706,806

(22) Filed: Dec. 8, 2019

(65) Prior Publication Data

US 2020/0386236 A1     Dec. 10, 2020

(30) Foreign Application Priority Data

Jun. 5, 2019   (CN) .......................... 201910485768.5

(51) Int. Cl.
 *G05B 11/01*   (2006.01)
 *F04D 27/00*   (2006.01)
(52) U.S. Cl.
 CPC ......... *F04D 27/004* (2013.01); *F04D 27/001* (2013.01); *G05B 11/011* (2013.01)

(58) Field of Classification Search
 None
 See application file for complete search history.

(56) References Cited

U.S. PATENT DOCUMENTS

| | | | | |
|---|---|---|---|---|
| 5,099,181 A * | 3/1992 | Canon | ....................... | H02P 6/08 318/400.26 |
| 5,457,766 A * | 10/1995 | Ko | ........................... | H02P 7/29 388/934 |
| 6,191,546 B1 * | 2/2001 | Bausch | .............. | H05K 7/20209 388/934 |
| 2006/0108962 A1 * | 5/2006 | Murray | ................ | G05B 13/024 318/610 |
| 2012/0218707 A1 * | 8/2012 | Chan | .................. | H05K 7/20518 361/679.48 |
| 2015/0156917 A1 * | 6/2015 | Ogawa | ............... | H05K 7/20136 361/695 |
| 2015/0195949 A1 * | 7/2015 | Liu | ........................ | H05K 7/207 62/89 |

\* cited by examiner

*Primary Examiner* — Bernard G Lindsay
(74) *Attorney, Agent, or Firm* — Winston Hsu

(57) ABSTRACT

A method for controlling an angular speed of a fan of a computer system includes obtaining an error value; obtaining an adjusted error value by adjusting the error value using an adjustment constant when an absolute value of the error value is not larger than a predetermined value; obtaining a total output value according to at least the adjusted error value; and controlling the angular speed of the fan according to the total output value. The total output value is positively related to a pulse width modulation value, and the angular speed of the fan increases when the pulse width modulation value increases.

8 Claims, 4 Drawing Sheets

METHOD FOR CONTROLLING ANGULAR SPEED OF A FAN BY ADJUSTING AN INTEGRAL VALUE BASED ON MINIMUM OR MAXIMUM OUTPUT

BACKGROUND OF THE INVENTION

1. Field of the Invention

The disclosure is related to a method for controlling an angular speed of a fan, and more particularly, a method for controlling an angular speed of a fan where the angular speed is related to a pulse width modulation value.

2. Description of the Prior Art

In the engineering field, it is a common requirement to properly control an angular speed of a device, but it is not an easy task. For example, controlling the fan speed in a server system is often a problem. A user can select a set-point temperature according to the needs and experience, and the fan speed can be increased to reduce the temperature when the temperature of a specific part of the server system is higher than the set-point temperature. Ideally, when a device of the server system (such as a central processing unit, CPU) has reached a steady state, the user can expect the fan speed to remain stable without frequent changes.

However, when the CPU has a multi-core architecture, even if the operation and temperature have stabilized, the CPU will still have a slight temperature change corresponding to the highest core temperature. In this case, if the speed of the fan is adjusted in response to slight temperature changes, the fan will often tremble, generate unexpected noise and consume additional power. Therefore, how to control the angular speed of a device according to different conditions for improving the stability of the device remains an issue to be solved.

SUMMARY OF THE INVENTION

An embodiment provides a method for controlling an angular speed of a fan. The method is used in a computer system including the fan. The method includes obtaining an error value; obtaining an adjusted error value by adjusting the error value using an adjustment constant when an absolute value of the error value is not larger than a predetermined value; obtaining a total output value according to at least the adjusted error value; and controlling the angular speed of the fan according to the total output value. The total output value is positively related to a pulse width modulation value, and the angular speed of the fan increases when the pulse width modulation value increases.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
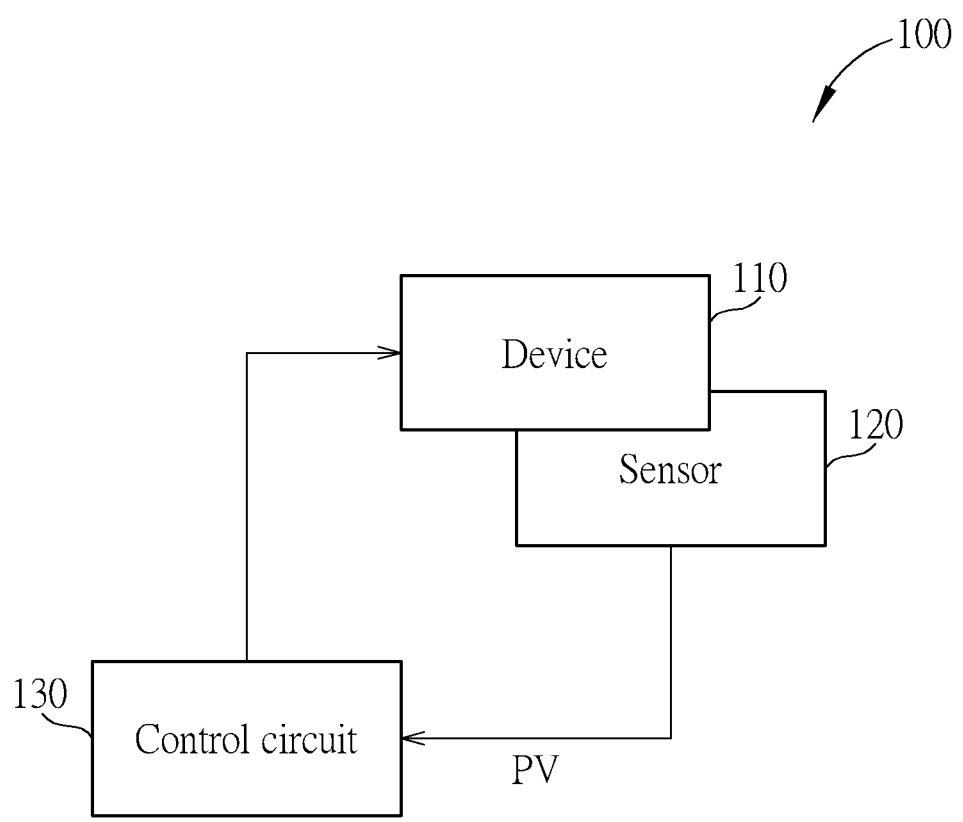
FIG. 1 illustrates a system according to an embodiment.
Figure 2:
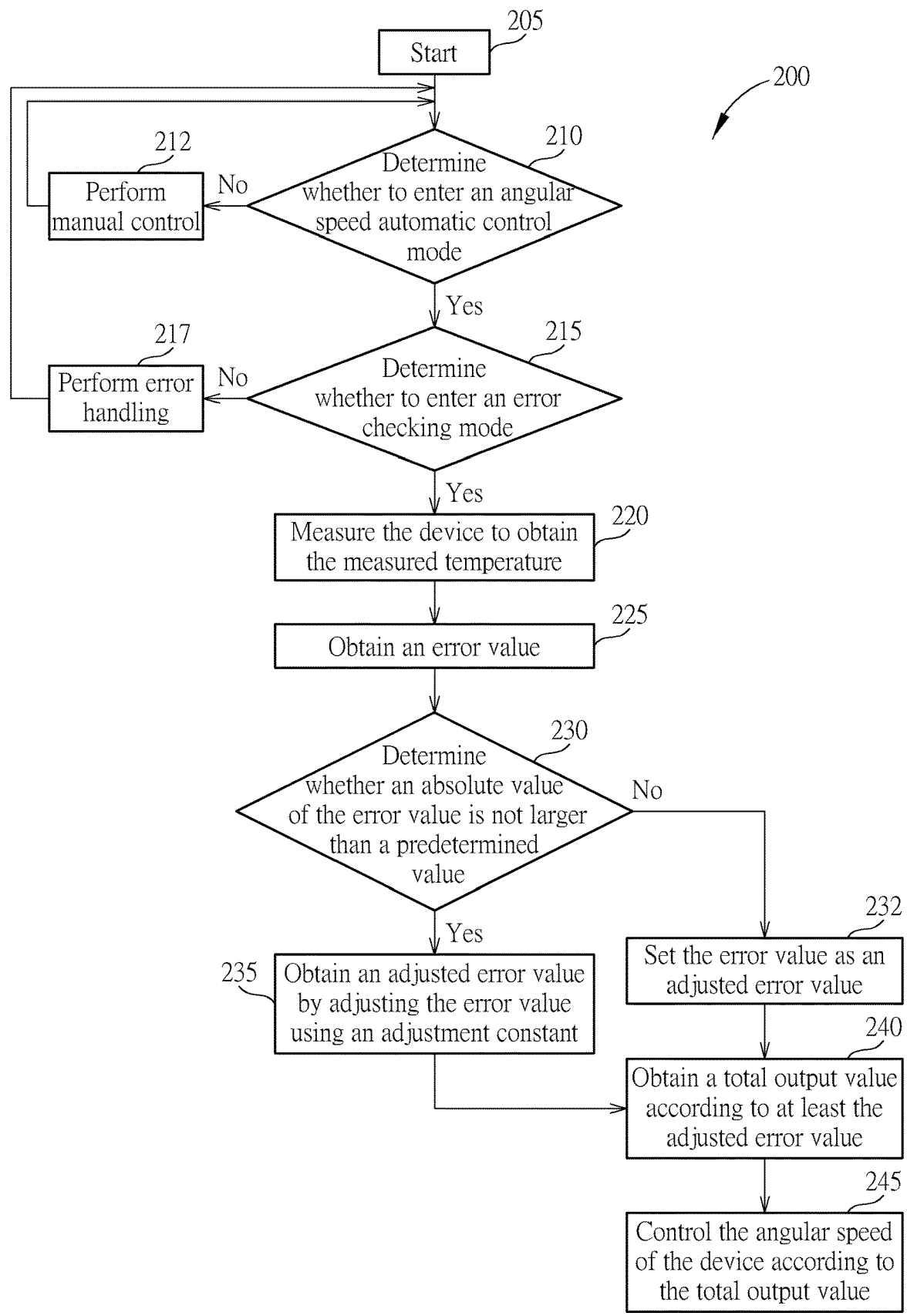
FIG. 2 shows a flowchart of a method for controlling an angular speed of a device of the system in FIG. 1.

According to an embodiment, regarding the control of an angular speed of a device, a PID (proportional-integral-derivative) feedback control method may be used. According to the PID feedback control method, a feedback error value can be used to perform proportional, integral and derivative calculations, and the angular speed can be adjusted according to the result of the calculations. In an example of a fan of a server system, the error value can be generated by subtracting a measured temperature from a set-point temperature of a component. The set-point temperature may be a fixed value, and the measured temperature may be varied with time. Hence, when a PID feedback control method is used to control the angular speed of the fan, the error value is zero in an ideal case. In other words, when the temperature of the server system reaches a stable state corresponding to the set-point temperature, the angular speed of the fan is fixed, and the temperature is kept in an equilibrium state. However the ideal state cannot be easily reached because when the fan generates a forced air convection inside the server, the temperature cannot be stabilized. Even if the angular speed of the fan is fixed, the temperature of each component may have its own minor fluctuation. For example, when a multi-core CPU reaches a stable temperature, the temperature may still swing by 1° C. With a 1° C. fluctuation, the temperature can be regarded as being stabilized. However when using the PID calculation, the temperature fluctuation may cause the fan to tremble and generate noise and additional power consumption. To reduce the abovementioned problem, a method for controlling an angular speed of a fan (i.e. fan speed) is provided by an embodiment. FIG. 1 shows a system 100 according to an embodiment. FIG. 2 shows a flowchart of a method 200 for controlling an angular speed of a device 110 of the system 100. The system 100 may include the device 110, a sensor 120 and a control circuit 130. The sensor 120 may sense the temperature of the device 110 to obtain a measured temperature PV(k) and send the measured temperature PV(k) to the control circuit 130. The control circuit 130 may perform the method 200 in FIG. 2 to control the angular speed of the device 110. The device 110 may be a fan or a device with a controllable angular speed. As shown in FIG. 1 and FIG. 2, the method 200 may include the following steps.

Step 205: start;
Step 210: determine whether to enter an angular speed automatic control mode; if so, go to Step 215; else, go to Step 212;
Step 212: perform manual control; go to Step 210;
Step 215: determine whether to enter an error checking mode; if so, go to Step 220; else, go to Step 217;
Step 217: perform error handling; go to Step 210;
Step 220: measure the device 110 to obtain the measured temperature PV(k);
Step 225: obtain an error value e(k);
Step 230: determine whether an absolute value |e(k)| of the error value e(k) is not larger than a predetermined value x; if so, go to Step 235; else, go to Step 232;
Step 232: set the error value e(k) as an adjusted error value $e_{ADJ}(k)$; go to Step 240;
Step 235: obtain an adjusted error value $e_{ADJ}(k)$ by adjusting the error value e(k) using an adjustment constant α;

Step 240: obtain a total output value $U_{total}$ according to at least the adjusted error value $e_{ADJ}(k)$; and Step 245: control the angular speed of the device 110 according to the total output value $U_{total}$.

The abovementioned variable k in brackets may be a variable related to time. For example, at a (k−1)th time point on a time axis, the temperature PV(k−1) may be obtained through measurement. At a kth time point on the time axis, the temperature PV(k) may be obtained through measurement, and so on. Likewise, regarding other parameters such as the error value e(k) and the adjusted error value $e_{ADJ}(k)$, the variable k may also be related to time. When the variable related to time is not limited to being k, the parameters may be shown without mentioning k. For example, the parameter such as the measured temperature PV, the error value e, and the adjusted error value $e_{ADJ}$ may be expressed without mentioning k.

According to an embodiment, in Step 225, the error value e(k) may be obtained according to a set-point temperature r and the measured temperature PV(k). For example, the error value e(k) may be obtained by subtracting the measured temperature PV(k) from the set-point temperature r as expressed as equation eq-1.

$$e(k)=r-PV(k) \quad (\text{eq-1})$$

According to an embodiment, in Step 230, it can be determined whether |e(k)|≤x, and the predetermined value x is a constant larger than zero. For example, if the predetermined value x is set to 1 (that is, x=1), Step 230 may be performed to check whether a difference between the measured temperature PV(k) and the set-point temperature r is greater than 1 temperature unit (e.g., 1° C.). According to an embodiment, the predetermined value x may be set to 1 or another appropriate value.

If the result of Step 230 is "no", it means the difference between the measured temperature PV(k) and the set-point temperature r is greater than the predetermined value. Therefore, Step 232 may be performed to set the error value e(k) as the adjusted error value $e_{ADJ}(k)$, that is, $e(k)=e_{ADJ}(k)$.

If the result of Step 230 is "yes", it means the difference between the measured temperature PV(k) and the set-point temperature r is not greater than the predetermined value. In other words, although the measured temperature PV(k) is not equal to the set-point temperature r, the difference between them is smaller. For avoiding unnecessary changes of the angular speed, Step 235 may be performed for making adjustment. In Step 235, the adjusted error value $e_{ADJ}(k)$ may be expressed as a function of the adjustment constant α and the error value e(k) such as $e_{ADJ}(k)=f(\alpha, e(k))$, where f( ) may be a function. According to an embodiment, the abovementioned function may be used to obtain the adjusted error value $e_{ADJ}(k)$ by multiplying the adjustment constant α by the error value e(k) as denoted by equation eq-2.

$$e_{ADJ}(k)=\alpha \times e(k) \quad (\text{eq-2})$$

According to an embodiment, the adjustment constant α may be a positive value between 0 and 1, that is, 0<α<1.

Figure 3:
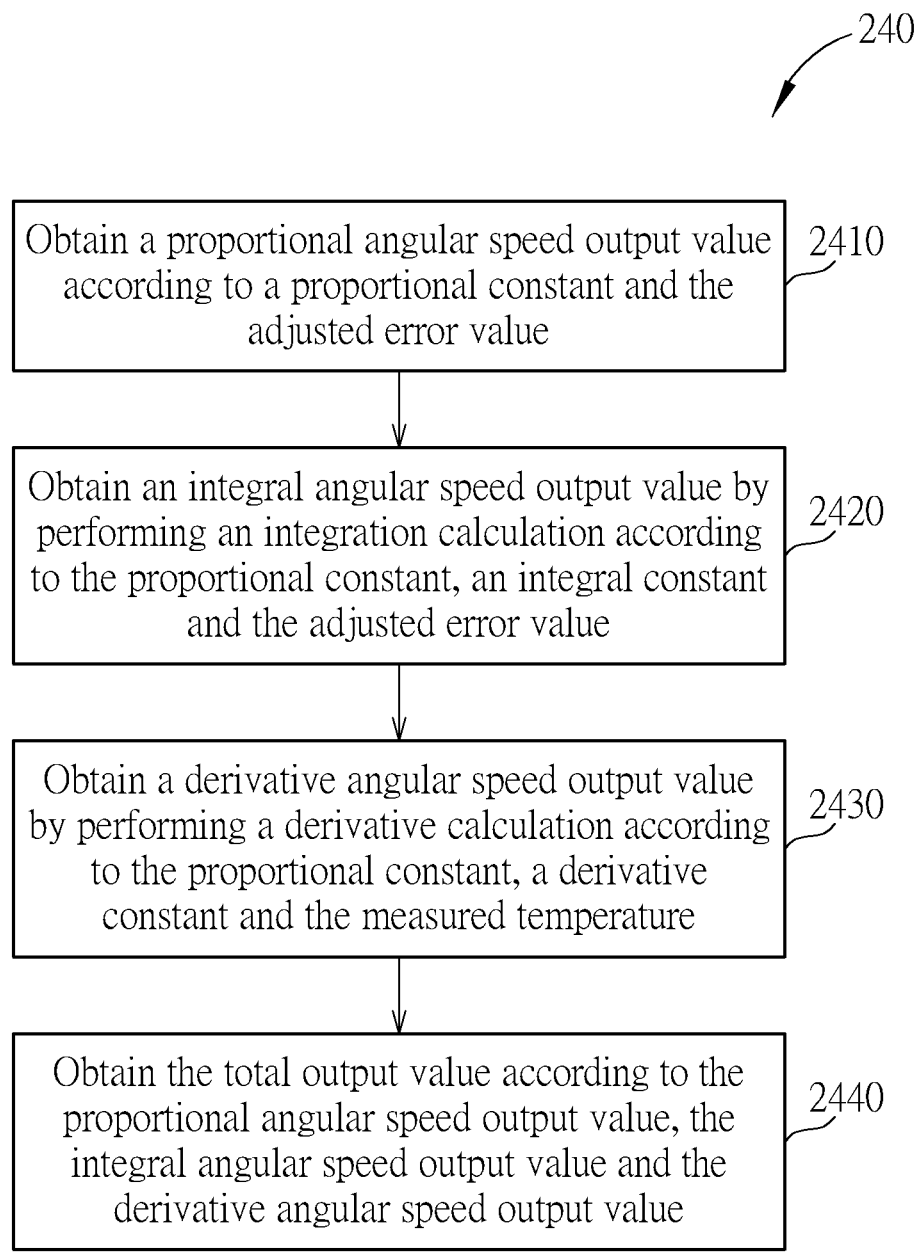
FIG. 3 shows a flowchart of obtaining the total output value in FIG. 2.

According to an embodiment, if a PID (proportional-integral-derivative) feedback control method is used, Step 240 may include the flow shown in FIG. 3. FIG. 3 shows a flowchart of obtaining the total output value $U_{total}$ in Step 240 of FIG. 2. Step 240 may include the following steps.

Step 2410: obtain a proportional angular speed output value $U_P$ according to a proportional constant $K_c$ and the adjusted error value $e_{ADJ}$;

Step 2420: obtain an integral angular speed output value $U_I$ by performing an integration calculation according to the proportional constant $K_c$, an integral constant $T_i$ and the adjusted error value $e_{ADJ}$;

Step 2430: obtain a derivative angular speed output value $U_D$ by performing a derivative calculation according to the proportional constant $K_c$, a derivative constant $T_d$ and the measured temperature PV; and Step 2440: obtain the total output value $U_{total}$ according to the proportional angular speed output value $U_P$, the integral angular speed output value $U_I$ and the derivative angular speed output value $U_D$.

According to an embodiment, the sequence of Step 2410 to Step 2430 may be changed, and FIG. 3 is merely an example.

According to an embodiment, in Step 2410, the proportional angular speed output value $U_P$ may be expressed using a function P( ) such as $U_P=P(K_c, e_{ADJ}(k))$. For example, the proportional angular speed output value $U_P$ may be expressed as equation eq-3.

$$U_P=K_c \times e_{ADJ}(k) \quad (\text{eq-3})$$

According to an embodiment, in Step 2420, the integral angular speed output value $U_I$ may be expressed using a function I( ) such as $U_I=I(K_c, T_i, e_{ADJ}(k), e_{ADJ}(k-1))$. The function I( ) may be used for an integration calculation performed corresponding to a time axis. For example, the integral angular speed output value $U_I$ may be expressed as (but not limited to be) equation eq-4.

$$U_I=(K_c/T_i)\times(\Sigma((e_{ADJ}(k)+e_{ADJ}(k-1))/2)\Delta t) \quad (\text{eq-4})$$

As described above, $e_{ADJ}(k)$ and $e_{ADJ}(k-1)$ may be adjusted error values at the kth time point and the (k−1)th time point. Δt may be a time span between the two time points. According to an embodiment, because measurement and sampling may be performed at the kth time point and the (k−1)th time point, Δt may be time required for performing measurement and sampling. The equation eq-4 may be used to perform a calculation of summation and integration according to changes of the error value.

According to an embodiment, in Step 2430, the derivative angular speed output value $U_D$ may be expressed using a function D( ) such as $U_D=D(K_c, T_d, PV(k), PV(k-1))$. The function D( ) may be used for a derivative calculation performed corresponding to a time axis. For example, the derivative angular speed output value $U_D$ may be expressed as (but not limited to be) equation eq-5.

$$U_D=-K_c \times T_d \times (PV(k)-PV(k-1))/\Delta t \quad (\text{eq-5})$$

As mentioned above, PV(k) and PV(k−1) may be the measured temperatures at the kth time point and the (k−1)th time point, and Δt may be the time span between the two time points.

According to an embodiment, in Step 2440, the total output value $U_{total}$ may be expressed using a function T( ) such as $U_{total}=T(U_P, U_I, U_D)$. For example, the $U_{total}$ may be expressed as (but not limited to be) equation eq-6.

$$U_{total}=U_P+U_I+U_D \quad (\text{eq-6})$$

In other words, the proportional angular speed output value $U_P$, the integral angular speed output value $U_I$ and the derivative angular speed output value $U_D$ may be summed up to obtain the total output value $U_{total}$. According to another embodiment, for example, the total output value $U_{total}$ may be expressed as $U_{total}=-(U_P+U_I+U_D)$.

According to an embodiment, the integral angular speed output value $U_I$ may be adjusted depending on the situation as described below. At the kth time point, when a sum of the proportional angular speed output value $U_P(k)$ and the integral angular speed output value $U_I(k)$ is smaller than the minimum output value $U_{min}$, the integral angular speed output value $U_I(k)$ may be adjusted to be a difference of the minimum output value $U_{min}$ and the proportional angular speed output value $U_P(k)$. In other words, the integral angular speed output value $U_I$ may be expressed as equation eq-7 as below.

If $U_P(k)+U_I(k)<U_{min}$, $$U_I(k)=U_{min}-U_P(k) \qquad \text{(eq-7)}$$

In another situation, at the kth time point, when the sum of the proportional angular speed output value $U_P(k)$ and the integral angular speed output value $U_I(k)$ is greater than the maximum output value $U_{max}$, the integral angular speed output value $U_I(k)$ may be adjusted to be a difference of the maximum output value $U_{max}$ and the proportional angular speed output value $U_P(k)$. In other words, the integral angular speed output value $U_I$ may be expressed as equation eq-8 as below.

If $U_P(k)+U_I(k)>U_{max}$, $$U_I(k)=U_{max}-U_P(k) \qquad \text{(eq-8)}$$

The abovementioned adjustment may be performed before Step 2440. The adjusted integral angular speed output value $U_I(k)$ may be used in Step 2440 to obtain the total output value $U_{total}$. For example, if the device 110 is a fan, the minimum output value $U_{min}$ may be corresponding to a lowest angular speed of the fan, and the maximum output value $U_{max}$ may be a highest angular speed of the fan.

According to an embodiment, the total output value $U_{total}$ obtained in Step 2440 may be positively related to a pulse width modulation (PWM) value. When the PWM value increases, the angular speed of the device 110 may increase. For example, when the PWM value increases, a duty ratio of a signal sent by the control circuit 130 and used to enable the device 110 may increase, increasing the angular speed of the device 110.

Figure 4:
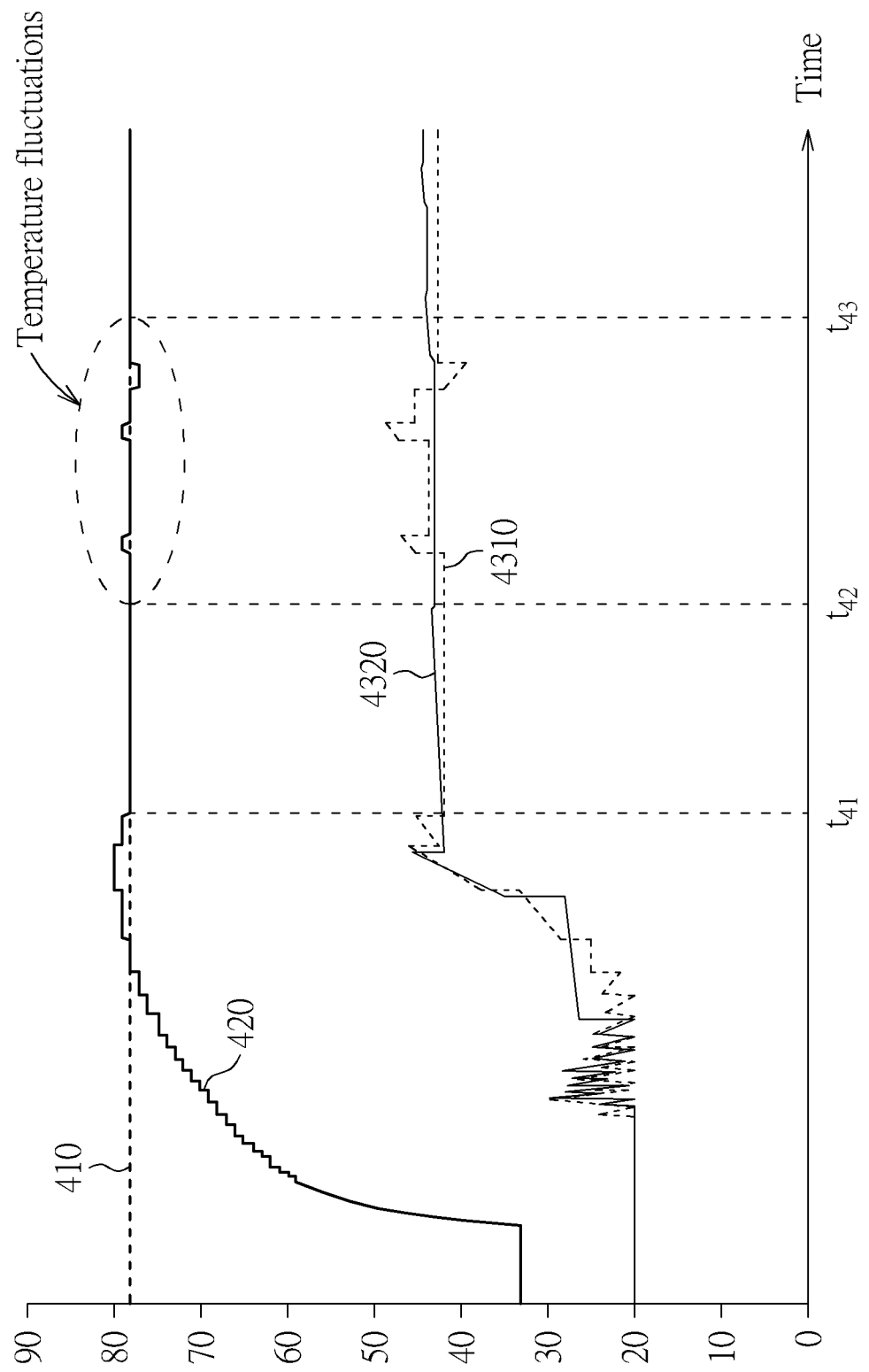
FIG. 4 shows waveforms of temperatures and angular speeds of a device of the system in FIG. 1.

FIG. 4 shows waveforms of temperatures and angular speeds of the device 110 according to an embodiment. The horizontal axis in FIG. 4 may be a time axis. A line 410 may be corresponding to the set-point temperature r, and the set-point temperature r may be a fixed value in this example. A curve 420 may be corresponding to the temperature of the device 110, that is, the abovementioned measured temperature PV. The curve 4310 may be corresponding to PWM values generated without using the method 200 of an embodiment. The curve 4320 may be corresponding to PWM values generated using the method 200 of an embodiment. For example, when the device 110 is a fan, as shown in FIG. 4, the temperature of the system may increase during a start point of the time axis to a time point $t_{41}$, so the PWM value may keep increasing to accelerate the fan for heat dissipation; the start point of the time axis may be corresponding to turning on the system. After reaching the time point $t_{41}$, the temperature of the system has reached the set-point temperature, and the curve 420 may be stable because heat generation and heat dissipation may be in a stable condition. Between the time point $t_{42}$ and the time point $t_{43}$, there may be slight fluctuations in temperature as shown by the curve 420. Without using the method provided by an embodiment, the fan speed may vary with temperature to have unwanted changes as shown by the curve 4310, and problems of vibration, noise and power consumption may be caused. By means of the method provided by an embodiment, adjustment of Step 230 and Step 235 may be performed to reduce or eliminate unwanted changes of the fan speed. The fan speed may be more stable as shown by the curve 4320, and problems of vibration, noise and power consumption may be prevented.

In summary, a method provided by an embodiment may perform adjustment according to an error value, and the effect of error-weighting may be achieved. According to an embodiment, when load or temperature of a system changes, adjustment may be performed according to related determinations, and this may avoid unnecessary changes of an angular speed of a device. As a result, a method provided by an embodiment can improve performance of a device and alleviate problems in the field of system control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an angular speed of a fan, the method for controlling the angular speed of the fan being used in a computer system comprising the fan, the method for controlling the angular speed of the fan comprising:
   obtaining an error value;
   obtaining an adjusted error value by adjusting the error value using an adjustment constant when an absolute value of the error value is not larger than a predetermined value;
   obtaining a proportional angular speed output value according to a proportional constant and the adjusted error value;
   obtaining an integral angular speed output value by performing an integration calculation according to the proportional constant, an integral constant and the adjusted error value;
   obtaining a derivative angular speed output value by performing a derivative calculation according to the proportional constant, a derivative constant and a measured temperature; and
   obtaining a total output value according to the proportional angular speed output value, the integral angular speed output value and the derivative angular speed output value;
   adjusting the integral angular speed output value to be a difference of a minimum output value and the proportional angular speed output value when a sum of the proportional angular speed output value and the integral angular speed output value is smaller than the minimum output value;
   controlling the angular speed of the fan according to the total output value;
   wherein the integration calculation and the derivative calculation are performed corresponding to a time axis, and the total output value is positively related to a pulse width modulation value, and the angular speed of the fan increases when the pulse width modulation value increases.

2. The method for controlling the angular speed of the fan of claim 1, further comprising:
   measuring the fan to obtain the measured temperature;
   wherein obtaining the error value is obtaining the error value according to a set-point temperature and the measured temperature.

3. The method for controlling the angular speed of the fan of claim 2, further comprising:
   entering an angular speed automatic control mode; and
   entering an error checking mode.

4. The method for controlling the angular speed of the fan of claim 2 wherein the error value is obtained by subtracting the measured temperature from the set-point temperature.

5. The method for controlling the angular speed of the fan of claim 1 wherein the predetermined value is 1.

6. The method for controlling the angular speed of the fan of claim 1 wherein obtaining the adjusted error value by adjusting the error value using the adjustment constant is obtaining the adjusted error value by multiplying the adjustment constant by the error value.

7. The method for controlling the angular speed of the fan of claim 1 wherein obtaining the total output value according to the proportional angular speed output value, the integral angular speed output value and the derivative angular speed output value comprises obtaining the total output value by summing up the proportional angular speed output value, the integral angular speed output value and the derivative angular speed output value.

8. A method for controlling an angular speed of a fan, the method for controlling the angular speed of the fan being used in a computer system comprising the fan, the method for controlling the angular speed of the fan comprising:
   obtaining an error value;
   obtaining an adjusted error value by adjusting the error value using an adjustment constant when an absolute value of the error value is not larger than a predetermined value;
   obtaining a proportional angular speed output value according to a proportional constant and the adjusted error value;
   obtaining an integral angular speed output value by performing an integration calculation according to the proportional constant, an integral constant and the adjusted error value;
   obtaining a derivative angular speed output value by performing a derivative calculation according to the proportional constant, a derivative constant and a measured temperature; and
   obtaining a total output value according to the proportional angular speed output value, the integral angular speed output value and the derivative angular speed output value;
   adjusting the integral angular speed output value to be a difference of a maximum output value and the proportional angular speed output value when a sum of the proportional angular speed output value and the integral angular speed output value is greater than the maximum output value;
   controlling the angular speed of the fan according to the total output value;
   wherein the integration calculation and the derivative calculation are performed corresponding to a time axis, and the total output value is positively related to a pulse width modulation value, and the angular speed of the fan increases when the pulse width modulation value increases.

\* \* \* \* \*